US012811166B2

(12) United States Patent
Bock et al.

(10) Patent No.: US 12,811,166 B2
(45) Date of Patent: Nov. 24, 2026

(54) GAS DIFFUSION SYSTEM WITH HIGH PURITY

(71) Applicant: Carl Freudenberg KG, Weinheim (DE)

(72) Inventors: Achim Bock, Weinheim (DE); Kristof Klein, Weinheim (DE); Christoph Rakousky, Ober-Ramstadt (DE); Hannes Barsch, Heidelberg (DE); Klaus Hirn, Hirschberg (DE); Klaus-Dietmar Wagner, Heddesheim (DE)

(73) Assignee: CARL FREUDENBERG KG, Weinheim (DE)

( * ) Notice: Subject to any disclaimer, the term of this patent is extended or adjusted under 35 U.S.C. 154(b) by 778 days.

(21) Appl. No.: 18/257,314

(22) PCT Filed: Dec. 13, 2021

(86) PCT No.: PCT/EP2021/085452
§ 371 (c)(1),
(2) Date: Jun. 14, 2023

(87) PCT Pub. No.: WO2022/128895
PCT Pub. Date: Jun. 23, 2022

(65) Prior Publication Data
US 2024/0047704 A1 Feb. 8, 2024

(30) Foreign Application Priority Data
Dec. 18, 2020 (DE) .................... 10 2020 134 219.5

(51) Int. Cl.
*H01M 8/0234* (2016.01)
*D04H 1/4242* (2012.01)
(Continued)

(52) U.S. Cl.
CPC ........ *H01M 8/0234* (2013.01); *D04H 1/4242* (2013.01); *D04H 1/43* (2013.01);
(Continued)

(58) Field of Classification Search
None
See application file for complete search history.

(56) References Cited

U.S. PATENT DOCUMENTS

2003/0109189 A1 6/2003 Jorder et al.
2003/0182730 A1 10/2003 Booker
(Continued)

FOREIGN PATENT DOCUMENTS

DE 102006060932 A1 7/2008
JP 2003213563 A 7/2003
(Continued)

*Primary Examiner* — Alix E Eggerding
(74) *Attorney, Agent, or Firm* — LEYDIG, VOIT & MAYER, LTD.

(57) ABSTRACT

A method for producing a gas diffusion layer for a fuel cell, including providing a fiber composition which includes carbon fibers and/or precursors of carbon fibers and subjecting the fiber composition to a method for producing a fibrous web. The method further includes consolidating the fibrous web by exposure to aqueous fluid jets to form a nonwoven, water used by the aqueous fluid jets having a conductivity of at most 250 microsiemens/cm at 25° C. If the fiber composition includes precursors of carbon fibers, the nonwoven is subjected to pyrolysis at a temperature of at least 1000° C.

18 Claims, 3 Drawing Sheets

(51) Int. Cl.

| | |
|---|---|
| ***D04H 1/43*** | (2012.01) |
| ***D04H 1/49*** | (2012.01) |
| ***D04H 1/492*** | (2012.01) |
| ***D06C 7/04*** | (2006.01) |
| ***D06M 11/74*** | (2006.01) |
| ***D06M 15/256*** | (2006.01) |
| *D06M 101/40* | (2006.01) |

(52) U.S. Cl.

CPC ............... *D04H 1/49* (2013.01); *D04H 1/492* (2013.01); *D06C 7/04* (2013.01); *D06M 11/74* (2013.01); *D06M 15/256* (2013.01); *D06M 2101/40* (2013.01); *D06M 2200/12* (2013.01); *D10B 2505/00* (2013.01)

(56) References Cited

U.S. PATENT DOCUMENTS

| | | | | |
|---|---|---|---|---|
| 2010/0035119 | A1* | 2/2010 | Wagner ................. | D06M 14/26 427/538 |
| 2014/0120322 | A1* | 5/2014 | Fu ............................ | B01J 35/58 428/176 |
| 2015/0083354 | A1 | 3/2015 | Strandqvist | |
| 2017/0338497 | A1 | 11/2017 | Tatsuno et al. | |
| 2019/0165379 | A1 | 5/2019 | Kajiwara et al. | |

FOREIGN PATENT DOCUMENTS

| | | | |
|---|---|---|---|
| JP | 2013175328 | A | 9/2013 |
| JP | 2015515387 | A | 5/2015 |
| KR | 1020170057428 | A | 5/2017 |
| WO | WO 0231841 | A2 | 4/2002 |
| WO | WO 03083196 | A1 | 10/2003 |

* cited by examiner

GAS DIFFUSION SYSTEM WITH HIGH PURITY

CROSS REFERENCE TO RELATED APPLICATIONS

This application is a U.S. National Phase application under 35 U.S.C. § 371 of International Application No. PCT/EP2021/085452, filed on Dec. 13, 2021, and claims benefit to German Patent Application No. DE 10 2020 134 219.5, filed on Dec. 18, 2020. The International Application was published in German on Jun. 23, 2022 as WO 2022/128895 A1 under PCT Article 21(2).

FIELD

The present invention relates to a method for producing a gas diffusion layer with high purity, to the gas diffusion layer obtainable by this method, and to a fuel cell which comprises such a gas diffusion layer.

BACKGROUND

Fuel cells utilize the chemical reaction of a fuel, more particularly of hydrogen, with oxygen to give water, in order to generate electrical energy. In hydrogen-oxygen fuel cells, hydrogen or a hydrogen-containing gas mixture is supplied to the anode, where an electrochemical oxidation takes place that releases electrons ($H_2 \rightarrow 2\ H^+ + 2e^-$). Via a membrane which provides gas-impervious separation and electrical isolation of the reaction spaces from one another, the protons are transported from the anode space into the cathode space. The electrons provided at the anode are passed on via an external conductor circuit to the cathode. The cathode is supplied with oxygen or an oxygen-containing gas mixture, and the oxygen is reduced, with acceptance of the electrons. The oxygen anions that are formed in this reaction react with the protons transported via the membrane, to form water ($\frac{1}{2} O_2 + 2H^+ + 2e^+ \rightarrow H_2O$).

There are many applications, especially in the automotive drivetrain, that use low-temperature proton exchange membrane fuel cells (PEMFCs, also referred to as polymer electrolyte membrane fuel cells) which have as their core a polymer electrolyte membrane (PEM) which is pervious only to protons (or oxonium ions $H_3O^+$) and water and which spatially separates the oxidizing agent, generally atmospheric oxygen, from the reducing agent. Applied to the gas-impervious, electrically isolating, proton-conducting membrane, on the anode and cathode sides, is a catalyst layer which forms the electrodes and which generally contains platinum as catalytically active metal. It is in the catalyst layers that the actual redox reactions and charge separations take place. Membrane and catalyst layers form an assembly also referred to as CCM (catalyst-coated membrane). Located on both sides of the CCM is a gas diffusion layer (GDL), which stabilizes the cell structure and takes on transport and distributor functions for reaction gases, water, heat, and current. Membrane, electrodes, and gas diffusion layer form the membrane electrode assembly (MEA). Arranged between the membrane electrode assemblies are flow distributor plates (known as bipolar plates) which have channels for supplying the adjacent cathode and anode with process gases, and which additionally, in general, have internal cooling channels.

The gas diffusion layers located between the flow distributor plates and the catalyst layers are of essential significance for the function and performance of the fuel cell.

Accordingly, the process components consumed in and formed in the electrode reactions must be transported through the gas diffusion layer and distributed homogeneously from the macroscopic structure of the flow distributor plates/bipolar plates to the microscopic structure of the catalyst layers. The electrons formed in and consumed in the half-cell reactions must be passed to the flow distributor plates with extremely low loss of voltage. The heat formed during this reaction must be carried away to the cooling means in the flow distributor plates, and so the materials of the GDL must also possess sufficient thermal conductivity. Moreover, the GDL must also act as a mechanical compensator between the macrostructured flow distributor plate and the catalyst layers.

Gas diffusion layers for fuel cells consist typically of a carbon fiber substrate, which is customarily furnished hydrophobically with fluoropolymers (e.g., PTFE) and coated over its area with a microporous layer (MPL). The MPL consists in general of a fluorine-containing polymer as binder (e.g., PTFE) and also of a porous and electrically conductive carbon material (e.g., carbon black or graphite powder). Carbon fiber substrates used for the GDL are currently the three following materials:

- carbon fiber papers (wet-laid and chemically bound carbon fiber nonwovens, with chemical binders, which are carbonized),
- carbon fiber fabrics (composed, for example, of yarns of oxidized but not yet carbonized polyacrylonitrile fibers, which are carbonized and/or graphitized after weaving),
- carbon fiber nonwovens (e.g., dry-laid, carded, and water jet-consolidated nonwovens of oxidized polyacrylonitrile which are subsequently thickness-calibrated and carbonized).

It is known that fuel cells may become contaminated owing to the entry of extraneous ions which are not involved in the electrode processes. Studies have therefore looked, for example, at the effect of the materials of the bipolar plates and of the cations and anions carried from them into the MEA of the fuel cell on cell performance. Further sources, especially of metallic cations, are emissions from the other materials in the cell, the system components such as tank, heat exchanger, conduits, etc., the air supply flow to the cathode, and contaminations of the hydrogen through production or transport. One possible problem of metallic ions introduced is that they may easily be picked up by the electrolyte membrane. The reason for this is the high affinity of the metal cations for the sulfonic acid groups of the perfluorinated cation exchanger membrane, which in general is greater than the affinity of the protons for the sulfonic acid groups.

It has now been found that the GDL as well may have a share in the encumbering of the MEA with extraneous ions. There is, consequently, a demand for gas diffusion layers which have only very low concentrations of ions, especially metal cations, and for methods for producing them. The GDLs are intended specifically to have a low concentration of cations of the kind customarily contained in water for technical applications, such as calcium, magnesium, sodium, and potassium ions. At the same time, the other mechanical properties of the GDL are not to be adversely altered.

In order to produce carbon fiber nonwovens, webs of carbon fibers or carbon fiber precursors may be subjected to consolidation by exposure to aqueous fluid jets. Fluidization methods of this kind (spunlace methods) for web consolidation with fluid jets and fluid streams, including fluidization with superheated steam jets, are familiar to the skilled person. One specific technique for the mechanical consolidation of nonwovens is that of water jet consolidation, in which water at an elevated pressure of about 20 to more than 400 bar is passed through a multiplicity of nozzles onto the web to be consolidated. The impulse force of the water jets here leads to mechanical anchoring of the fibers in the product. Serving as the tool for this technique are what are called nozzle strips, which may be mounted in one or more rows. Each row here has a multiplicity of nozzles. The maximum number of nozzles may be up to 20 000 nozzles per strip, with typical nozzle diameters being situated in a range from 0.05 to 0.3 mm.

WO 0231841 describes a conductive nonwoven obtained from a fibrous web of preoxidized fibers for carbon fibers, by consolidation of the fibrous web with high-pressure fluid jets at pressures of 100 to 300 bar, compaction of the consolidated fiber web, and subsequent carbonization and/or graphitization under an inert gas atmosphere at temperatures of 800° C. to 2500° C.

DE 10 2006 060 932 A1 describes temperature-stable constructs comprising fibers and a coating, this coating being bonded covalently to the surface of the fibers. The constructs specifically are conductive nonwovens which have been subjected to plasma coating with fluorinated hydrocarbons and which are suitable as a gas diffusion layer for fuel cells. To produce the conductive nonwoven, carbon fibers or carbon fiber precursors are laid to form a fibrous web, which is consolidated by exposure to high-pressure fluid jets and subsequently predried, calendered, and carbonized.

US 2019/0165379 A1 describes a material for a gas diffusion layer based on a carbon fiber nonwoven which in the plane has regions with high surface weights and regions with low surface weights, where at least one of the surfaces of the nonwoven has a nonplanar pattern with indentations and elevations, this pattern being independent of the weight distribution of the fibers. The production of the nonwoven comprises a water jet method.

None of the documents cited above contains information relating to the quality of the water used in the water jet treatment.

SUMMARY

In an embodiment, the present disclosure provides a method for producing a gas diffusion layer for a fuel cell, comprising providing a fiber composition which comprises carbon fibers and/or precursors of carbon fibers and subjecting the fiber composition to a method for producing a fibrous web. The method further comprises consolidating the fibrous web by exposure to aqueous fluid jets to form a nonwoven, water used by the aqueous fluid jets having a conductivity of at most 250 microsiemens/cm at 25° C. If the fiber composition comprises precursors of carbon fibers, the nonwoven is subjected to pyrolysis at a temperature of at least 1000° C.

Figure 1:
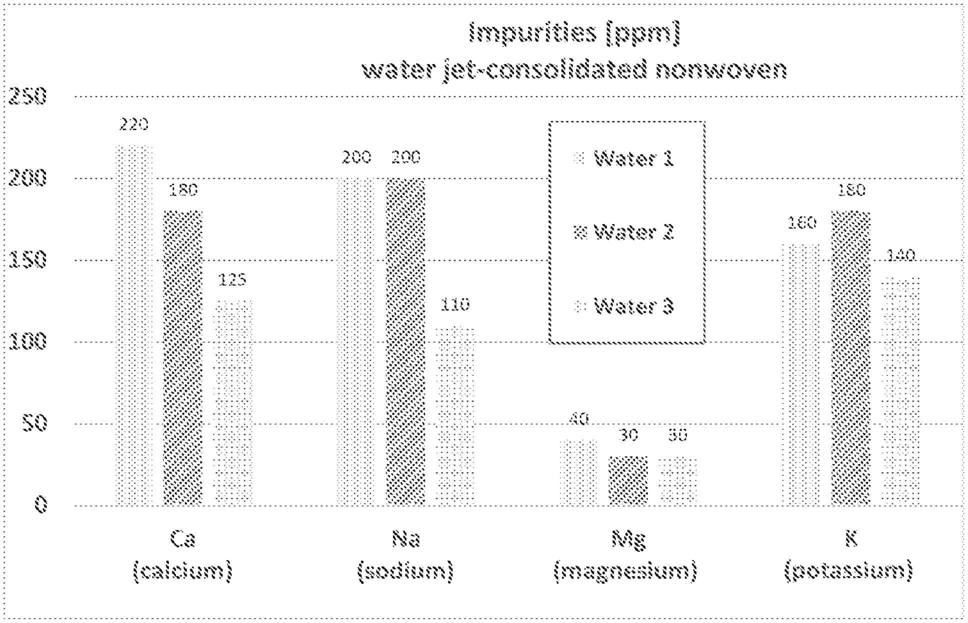
FIG. 1 shows the metal contents ($Ca^{2+}$, $Na^+$, $Mg^{2+}$ and $K^+$) of an untreated nonwoven and of a nonwoven consolidated with water differing in conductivity.
Figure 2:
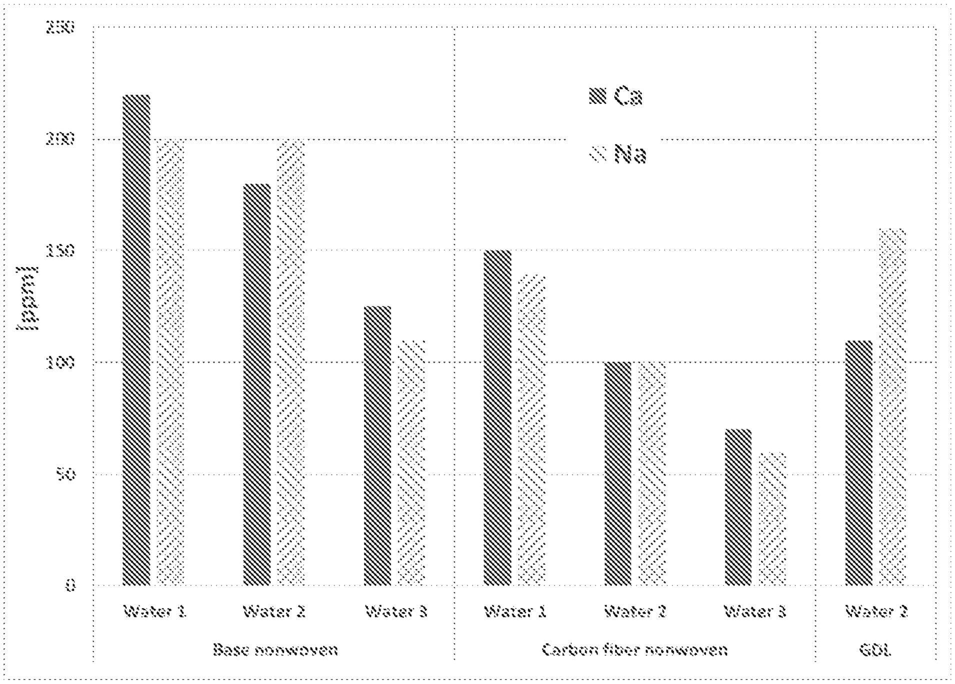
FIG. 2 shows the content of $Ca^{2+}$ and $Na^+$ ions in a base nonwoven consolidated with water differing in conductivity, of the carbon fiber nonwoven obtained therefrom by carbonization, and of a gas diffusion layer obtained after application of an MPL.
Figure 3:
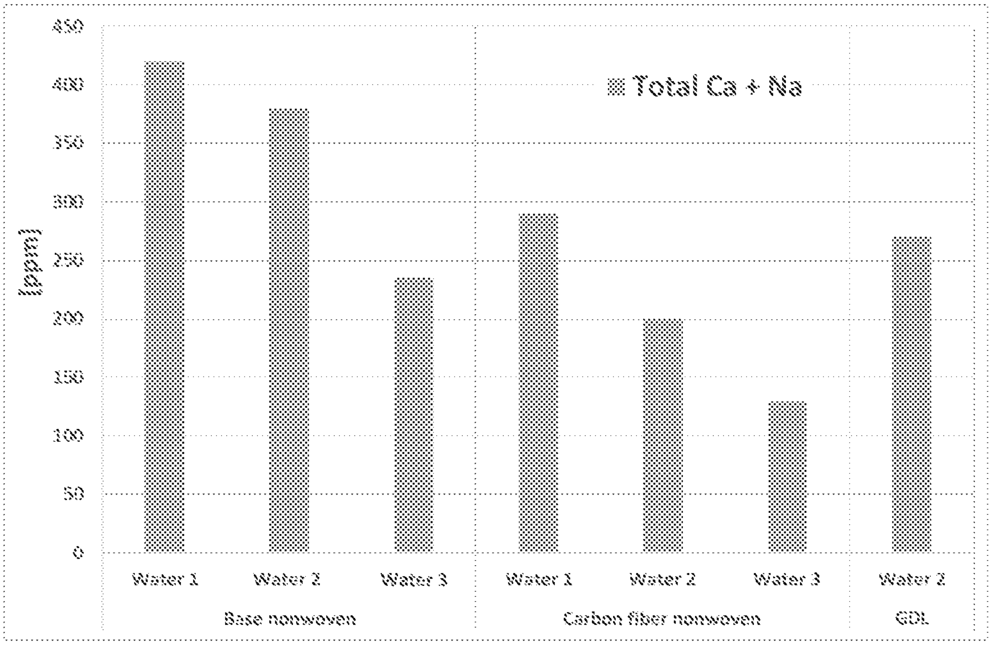
FIG. 3 in analogy to FIG. 2, shows the total content of $Ca^{2+}$ and $Na^+$ ions.

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

DETAILED DESCRIPTION

It has now been found that high-purity carbon fiber nonwovens can be produced by subjecting dry-laid webs of carbon fibers or carbon fiber precursors to consolidation by exposure to aqueous fluid jets. Specifically with a water jet consolidation method, surprisingly, it is possible to produce high-purity nonwovens having a very low ionic concentration, which can be processed into GDLs with a likewise very low ionic concentration. The nonwovens obtained are notable, advantageously, for a very low number of so-called nozzle strip defects. These defects may arise from the blockage of individual nozzles in the nozzle strip.

An embodiment of the invention provides a method for producing a gas diffusion layer for a fuel cell, comprising:

a) providing a fiber composition which comprises carbon fibers and/or precursors of carbon fibers,
b) subjecting the fiber composition provided in step a) to a method for producing a fibrous web,
c) consolidating the fibrous web by exposure to aqueous fluid jets to form a nonwoven, the water used having a conductivity of at most 250 microsiemens/cm at 25° C.,
d) optionally subjecting the nonwoven obtained in step c) to a thermal and/or mechanical treatment for drying and/or further consolidation,
e) if the fiber composition used in step a) comprises precursors of carbon fibers, subjecting the nonwoven to pyrolysis at a temperature of at least 1000° C.

In an embodiment, the nonwoven from step c), d) or e) (i.e., according to which of these steps are carried out, following the last of these steps) is furnished with a hydrophobizing agent (=step f)).

In an embodiment, the nonwoven from step c), d), e) or f) (i.e., according to which of these steps are carried out, following the last of these steps) is coated with a microporous layer (=step g)).

An embodiment of the invention additionally relates to a fibrous web consolidated by exposure to aqueous fluid jets (water jet-consolidated nonwoven) having a very low ionic concentration. Another embodiment of the invention, therefore, is a nonwoven obtainable by a method which comprises:

a) providing a fiber composition which comprises carbon fibers and/or precursors of carbon fibers,
b) subjecting the fiber composition provided in step a) to a method for producing a fibrous web,
c) consolidating the fibrous web by exposure to aqueous fluid jets to form a nonwoven, the water used having a conductivity of at most 250 microsiemens/cm at 25° C.

With regard to steps a), b) and c), reference is made in full to the statements which follow in relation to these steps.

An embodiment of the invention is a gas diffusion layer, as defined above and below, or obtainable by a method as defined above and below.

An embodiment of the invention is a fuel cell comprising at least one gas diffusion layer as defined above and below, or obtainable by a method as defined above and below.

The gas diffusion layers obtained by the method of embodiments the invention have advantages as follows:

The carbon fiber nonwovens obtained from dry-laid carbon fibers by water jet consolidation, and the GDLs based thereon, are notable for a very low ionic concentration.

The nonwovens obtained from dry-laid carbon fiber precursors by water jet consolidation and subsequent carbonization or graphitization, and the GDLs based thereon, are also notable for a very low ionic concentration.

The nonwovens obtained by water jet consolidation according to the method have a very low number of so-called nozzle strip defects.

In comparison to the GDLs used to date in the prior art, those of embodiments of the invention have comparably good mechanical properties.

Fuel cells based on the GDLs of embodiments of the invention possess a longer lifetime relative to fuel cells based on conventional GDLs.

The gas diffusion layer of an embodiment of the invention and obtainable by the method of embodiments of the invention comprises, as sheetlike, electrically conductive material, a carbon fiber nonwoven. The carbon fiber nonwoven and the gas diffusion layer are extensive structures which possess a substantially two-dimensional, planar extent and a thickness which is lower in relation to said extent. The gas diffusion layer has a base area which in general corresponds substantially to the base area of the adjacent membrane with the catalyst layers, and to the base area of the adjacent flow distributor plate of the fuel cell. The shape of the base area of the gas diffusion layer may be, for example, polygonal (n-gonal with n≥3, e.g., trigonal, tetragonal, pentagonal, hexagonal, etc.), circular, circle-segment-shaped (e.g., semicircular), ellipsoidal or ellipse-segment-shaped. The base area is preferably rectangular or circular.

Production of the Gas Diffusion Layer

Step a)

In step a) of the method of an embodiment of the invention, a fiber composition is provided which comprises carbon fibers and/or precursors of carbon fibers.

Preferred carbon fibers consist to an extent of at least 90 wt %, preferably at least 92 wt %, based on their total weight, of carbon. In an embodiment, carbon fibers can be used which have undergone graphitization. These carbon fibers have a higher carbon content and in that case consist in particular to an extent of at least 95 wt % of carbon.

Suitable precursors for carbon fibers are fibers from synthetic or natural sources which through one or more treatment steps can be converted into carbon fibers (carbonization). They include, for example, fibers of polyacrylonitrile homo- and copolymers (PAN fibers), phenolic resins, polyesters, polyolefins, cellulose, aramids, polyetherketones, polyetheresterketones, polyethersulfones, polyvinyl alcohol, lignin, pitch, and mixtures thereof. The fiber composition provided in step a) preferably comprises PAN fibers as precursor fibers or consists of PAN fibers as precursor fibers. In a first preferred embodiment, the fiber composition provided in step a) comprises PAN fibers and fibers different therefrom, being preferably selected from fibers of phenolic resins, polyesters, polyolefins, cellulose, aramids, polyetherketones, polyetheresterketones, polyethersulfones, polyvinyl alcohol, lignin, pitch, and mixtures thereof. Such additional polymers are present preferably in an amount of up to 50 wt %, more preferably of up to 25 wt %, based on the carbon fiber precursor, in said precursor. In a second preferred embodiment, the fiber composition provided in step a) consists exclusively of PAN fibers.

Suitable PAN fibers are selected from PAN homopolymers, PAN copolymers, and mixtures thereof. PAN copolymers contain in copolymerized form at least one comonomer which is preferably selected from (meth)acrylamide, alkyl acrylates, hydroxyalkyl acrylates, alkylether acrylates, polyether acrylates, alkyl vinyl ethers, vinyl halides, vinylaromatics, vinyl esters, ethylenically unsaturated dicarboxylic acids, their mono- and diesters, and mixtures thereof. For example, the comonomer is selected from acrylamide, methyl acrylate, methyl methacrylate, ethyl acrylate, n-propyl acrylate, n-butyl acrylate, n-octyl acrylate, lauryl acrylate, stearyl acrylate, 2-ethylhexyl acrylate, benzyl acrylate, 2-hydroxyethyl acrylate, 2-hydroxypropyl acrylate, 4-hydroxybutyl acrylate, 2-methoxyethyl acrylate, 4-methoxybutyl acrylate, diethylene glycol ethyl ether acrylate, 2-butoxyethyl acrylate, ethyl vinyl ether, acrylic acid, methacrylic acid, itaconic acid, monomethyl itaconate, monolauryl itaconate, dimethyl fumarate, styrene, vinyl acetate, vinyl bromide, vinyl chloride, etc. Where a polyacrylonitrile copolymer fiber is used as carbon fiber precursor in step a), the fraction of comonomers is at most 20 wt %, preferably at most 10 wt %, based on the total weight of the monomers used for the polymerization. Preference is given to using polyacrylonitrile homopolymer fibers as carbon fiber precursor in step a).

PAN polymers may for example as a solution be spun into filaments by wet spinning and coagulation, and amalgamated into tows (fiber bundles). PAN copolymers often have a lower melting point than PAN homopolymers and are therefore suitable not only for use in wet spinning processes but also in melt spinning processes. The PAN fibers obtained accordingly are generally subjected to oxidative cyclization (also referred to for short as oxidation or stabilization) in an oxygen-containing atmosphere at elevated temperatures of about 180 to 300° C. The resultant chemical crosslinking improves the dimensional stability of the fibers.

Without further processing, the fibers obtained in the oxidative cyclization may be used as precursors of carbon fibers in step a). It is also possible to subject the fibers obtained in the oxidative cyclization to at least one processing step, selected preferably from cleaning, coating with at least one sizing agent, drying, and combinations of at least two of these treatment steps. In order to clean the fibers after the electrochemical oxidation, they may undergo a washing operation. The washing serves specifically to remove fiber fragments. The washing is generally followed by a drying step. To modify the surface properties, the fibers may be coated at least partly with at least one sizing agent. The sizing agent may be used, for example, in the form of a solution in a suitable solvent, or in the form of a dispersion. To apply the coating, the fibers may be passed for example through a size bath. The size may be detached at least partly from the fibers during the water jet consolidation in step c). If the water used for consolidating the fibrous web in step c) is at least partly recycled, it may be advantageous to subject the wastewater from the water jet consolidation to processing to remove some or all of the size contained in the wastewater.

After the coating of the fibers with at least one sizing agent, they are subjected in general to (further) drying. The drying may be carried out in each case for example using hot air, hot plates, heated rolls or heat lamps.

The carbon fiber precursors thus obtained may be used as fiber composition in step a) of the method of an embodiment of the invention and processed further. An alternative possibility is to subject a fiber composition comprising PAN fibers or consisting of PAN fibers to pyrolysis at a temperature of at least 1000° C., in the course of which the PAN precursors are transformed into carbon fibers. Regarding the pyrolysis conditions, reference is made to the statements below regarding step e). The carbon fibers thus obtained may likewise be used as fiber composition in step a) of the method of an embodiment of the invention and processed further.

Step b)

In step b) of the method of an embodiment of the invention, the fiber composition provided in step a) is subjected to a method for producing a fibrous web (carbon fiber web or carbon fiber precursor web). Suitable methods for nonwoven production are known to the skilled person and described for example in H. Fuchs, W. Albrecht, Vliesstoffe, 2nd edn. 2012, p. 121 ff., Wiley-VCH. They include, for example, dry processes, wet processes, extrusion processes, and solvent processes. In one preferred version, the fiber composition provided in step a) is subjected in step b) to a dry-laying process for producing a fibrous web. Dry-laid nonwovens can in principle be produced by a carding process or by an aerodynamic process. According to the carding process, a fibrous web is formed by means of flat card or roller card, whereas in aerodynamic processes the webs are formed from fibers by means of air. If desired, the fibrous webs may be placed one above another in multiple layers to form a web. The dry-laying process in step b) may comprise modification of the properties, by web stretching, for example. In this way there may, for example, be a calibration of web thickness and/or a preconsolidation of the fibrous web.

Step c)

In step c) of the method of an embodiment of the invention, the fibrous web obtained in step b) is consolidated by exposure to aqueous fluid jets to form a nonwoven. Aqueous fluid jets here covers fluid streams and steam jets as well.

Suitability in principle for the water jet consolidation is possessed by the mechanical consolidating methods known for this purpose, which are also referred to as spunlace methods. Also suitable, fundamentally, is the steam-jet technology, in which superheated steam jets are used for web consolidation. Such methods are known to the skilled person. In one specific technique for the mechanical consolidation of nonwovens, water at an elevated pressure of about 20 to 500 bar is passed through a multiplicity of nozzles onto the web to be consolidated. These nozzles are arranged in one or more rows in what are called nozzle strips. These nozzle strips have a multiplicity of nozzles in each row. The maximum number of nozzles may be up to 20 000 nozzles per strip, with typical nozzle diameters being in a range from 0.05 to 0.5 mm. The hole diameters of the nozzles generally have very low tolerances of, for example, less than 2 mm. In order to achieve defect-free nonwovens, it is necessary for the hole diameters of the nozzles not to alter in operation and in particular for the nozzles not to close up.

It has now been found that the conductivity of the water used for consolidating the fibrous web (or simply web) is key to the quality of the gas diffusion layers produced therefrom for usage in fuel cells. It is therefore a critical feature of the method of an embodiment of the invention that the water used for consolidating the nonwoven in step c) has a conductivity of at most 250 microsiemens/cm (μS/cm) at 25° C. The water used in step c) preferably has a conductivity of at most 200 microsiemens/cm at 25° C., more preferably of at most 150 microsiemens/cm at 25° C., more particularly of at most 100 microsiemens/cm at 25° C.

The electrical conductivity is a collective indicator of the ionic concentration, this being the fraction of dissociated substances dissolved in a defined amount of water. The conductivity here is dependent on factors including the concentration of the dissolved substances, their degree of dissociation, and the valence and mobility of the cations and anions formed, and also the temperature. The conductivity measurement is based on the determination of the ohmic resistance of the water sample for analysis, or the reciprocal of the resistance, the electric conductance value (unit siemens $S=\Omega^{-1}$). The conductivity may be measured using commercially available conductivity meters (conductometers). The measurement values here are reported generally in S/cm (siemens per centimeter) or, for water samples with a low ionic load, in μS/cm (microsiemens per centimeter).

Process and operating water for industrial processes customarily comes from the public drinking water network or is drawn from springs, rivers and lakes. Drinking water and process water for processes critical in terms of water quality are generally checked for their ingredients and subjected if necessary to water conditioning processes. The requirements on the purity of water are extremely diverse, according to the particular field of use. Thus drinking water is supplied as a clear, colorless liquid, free from odors and harmful microorganisms and substances, but enriched with vital minerals and salts. This water is of food grade, but is not necessarily suitable for many technical areas of application. Hence the limiting value for the conductivity according to the German drinking water ordinance (TrinkwV 2001, new version of Mar. 10, 2016) is 2790 microsiemens/cm at 25° C. The mains water supplied by German waterworks has a conductivity of 250 to 1000 microsiemens/cm at 25° C., according to hardness level. The major fraction in the case of the inorganic cations is accounted for by $Na^+$, $K^+$, $Ca^{2+}$ and $Mg^{2+}$.

To provide the water used in step c) in an embodiment of the invention, an available drinking or process water may be subjected to conditioning to reduce the ionic concentration. This includes ion exchange, electrode ionization, membrane processes, such as nanofiltration, reverse osmosis and electrodialysis, thermal processes, such as flash evaporation, etc.

The ionic concentration is preferably reduced using a nanofiltration, reverse osmosis, or a combination of these methods. Both nanofiltration and reverse osmosis are based on the passage of the water for conditioning through a semipermeable membrane under pressure which is higher than the osmotic pressure, to give a permeate with reduced ionic concentration. The nanofiltration in this case takes place at lower pressures than the reverse osmosis, and therefore has a lower cleaning performance than the reverse osmosis, but in many cases is sufficient. Also possible is a precleaning through nanofiltration and a further reduction in the ionic concentration through a subsequent reverse osmosis.

The water used in step c) preferably has a content of $Na^+$ ions of at most 200 ppm by weight, more preferably of at most 25 ppm by weight.

The water used in step c) preferably has a content of $K^+$ ions of at most 200 ppm by weight, more preferably of at most 10 ppm by weight.

The water used in step c) preferably has a content of $Mg^{2+}$ ions of at most 10 ppm by weight.

The water used in step c) preferably has a content of $Ca^{2+}$ ions of at most 200 ppm by weight, more preferably of at most 40 ppm by weight.

In an embodiment of the method of the invention, the water used in step c) for consolidating the fibrous web is partly or fully recycled. The method of an embodiment of the invention therefore makes it possible to reduce the freshwater demand and the quantity of wastewater requiring disposal for the water jet consolidation. This ensures that the water used for treating the fibrous web always has a conductivity within the range according to embodiments the invention and also that otherwise contamination of the fibrous web with components present in the water jet consolidation wastewater is avoided. For this purpose, the water jet consolidation wastewater may be exchanged and/or subjected partly or fully to conditioning.

The conditioning and/or the exchange of the water jet consolidation wastewater may take place continuously or at intervals.

In a preferred method, a fibrous web is consolidated by exposure to aqueous fluid jets to form a nonwoven, a wastewater stream is extracted from the treatment of the fibrous web, a setpoint value is specified for the conductivity of the wastewater stream, the actual value of the conductivity of the wastewater stream is determined, on attainment of a limiting value for the deviation of the actual value from the setpoint value, the wastewater stream is subjected at least partly to processing and/or to exchange with water of lower ionic concentration, and the wastewater stream is returned at least partly to the treatment of the fibrous web.

For the conditioning, the wastewater stream may be subjected to reduction of the ionic concentration, as described above. The wastewater stream may additionally be subjected to a further cleaning, for the removal of fibers and fiber fragments, for example.

Step d)

The nonwoven obtained in step c) may be subjected optionally to thermal and/or mechanical treatment for drying and/or further consolidation. Suitable drying methods are convection drying, contact drying, radiation drying, and combinations thereof.

The nonwoven obtained in step c) is subjected preferably to treatment by calendering. The calendering permits a further thermal consolidation of the nonwoven and at the same time a thickness calibration. In this case it is also possible for two or more web layers to be joined to one another. In one specific embodiment, the nonwoven obtained in step c) contains thermoplastic fibers which serve as binding fibers and in general are carbonizable. In this case, the nonwoven may undergo thermal calender consolidation in step d) to form binding sites at which fibers are plastified and welded to one another (thermobonding).

Step e)

If the fiber composition used in step a) comprises precursors of carbon fibers, the nonwoven in step e) is subjected to pyrolysis at a temperature of at least 1000° C. A distinction is made between carbonization and graphitization depending on the temperature in the pyrolysis. Carbonization refers to a treatment at about 1000 to 1500° C. in an inert gas atmosphere, leading to the elimination of volatile products. Graphitization, i.e., heating to about 2000 to 3000° C. under inert gas, produces what are called high-modulus fibers or graphite fibers. The carbon fraction increases in the pyrolysis, for example, from around 67 wt % on treatment at temperatures of below 1000° C. to about 99 wt % on treatment at temperatures of above 2000° C. The fibers obtained by graphitization especially possess a high purity, are lightweight and of high strength, and are highly conductive for electricity and heat.

Step f)

Subsequent to step c), d) or e), the nonwoven may optionally be furnished with at least one additive. The additives are preferably selected from hydrophobizing agents f1), conductivity-improving additives f2), further additives f3)—different from f1) and f2)—and mixtures thereof.

The nonwoven is preferably coated and/or impregnated (furnished) with a hydrophobizing agent f1) which comprises at least one fluorine-containing polymer. The fluorine-containing polymer is preferably selected from polytetrafluoroethylenes (PTFE), tetrafluoroethylene-hexafluoropropylene copolymers (FEP), perfluoroalkoxy polymers (PFA), and mixtures thereof. Perfluoroalkoxy polymers are, for example, copolymers of tetrafluoro-ethylene (TFE) and perfluoroalkoxyvinyl ethers, such as perfluorovinyl propyl ether. A preferred fluorine-containing polymer used is a polytetrafluoroethylene.

The mass fraction of the fluorine-containing polymer f1) is preferably 0.5 to 40%, more preferably 1 to 20%, more particularly 1 to 10%, based on the mass of the nonwoven. In one specific embodiment, the fluorine-containing polymer is PTFE and the mass fraction thereof is 0.5 to 40%, preferably 1 to 20%, more particularly 1 to 10%, based on the mass of the nonwoven.

In many cases the nonwoven already possesses good electrical and thermal conductivity by virtue of the carbon fibers used, even without conductivity-improving additives. To improve the electrical and the thermal conductivity, however, the nonwoven may additionally be furnished with at least one conductivity-improving additive f2). The nonwoven is preferably furnished with a conductivity-improving additive f2) which is selected from metal particles, carbon black, graphite, graphene, carbon nanotubes (CNTs), carbon nanofibers, and mixtures thereof. The conductivity-improving additive f2) preferably comprises carbon black or consists of carbon black. The furnishing of the nonwoven with at least one conductivity-improving additive f2) may take place, for example, jointly with the polymer f1) and/or further additives f3). The nonwoven is preferably furnished using an aqueous dispersion.

The mass fraction of the conductivity-improving additive f2) is preferably 0.5 to 45%, preferably 1 to 25%, based on the mass of the nonwoven. In one specific embodiment, the conductivity-improving additive f2) comprises carbon black or consists of carbon black, and the mass fraction is 0.5 to 45%, preferably 1 to 25%, based on the mass of the nonwoven.

The nonwovens may additionally be furnished with at least one further additive f3). These include, for example, surface-active substances and polymeric binders other than components f1) and f2), and so on. Suitable binders f3) are, for example, furan resins, etc. The nonwovens specifically may be additionally furnished with at least one polymer other than f1), in which case preferably high-performance polymers are employed. The further polymers f3) are preferably selected from polyaryletherketones, polyphenylene sulfides, polysulfones, polyether-sulfones, semiaromatic (co)polyamides, polyimides, polyamideimides, polyetherimides, and mixtures thereof. The furnishing of the nonwoven with at least one additive f3) may take place, for example, jointly with the polymer f1) and/or conductivity-improving additives f2). The binders f3) may optionally be subsequently cured. This may be accomplished, for example, jointly with the drying and/or sintering after the furnishing with the polymers f1), or else separately therefrom.

The overall mass fraction of further additives f3) is preferably 0 to 80%, preferably 0 to 50%, based on the mass of the nonwoven. If the nonwovens additionally comprise at least one further additive f3), the overall mass fraction of further additives f3) is 0.1 to 80%, preferably 0.5 to 50%, based on the mass of the nonwoven.

The nonwoven preferably has a thickness in the range from 50 to 500 μm, more preferably of 100 to 400 μm. This thickness relates to the unfurnished, uncompressed state of the nonwoven, i.e., before the installation of the GDL in a fuel cell.

The furnishing of the nonwovens with components f1), f2) and/or f3) may take place by application techniques known to the skilled person, such as, in particular, by coating and/or impregnating. For coating and/or impregnating the nonwovens, a process is preferably used which is selected from mangle padding, knife coating, spraying, nip padding, and combinations thereof.

In the mangle padding process, the nonwoven is passed through a pad mangle (dip tank) containing the additive-containing solution or dispersion and then squeezed off to the desired application rate of additive through a pressure-adjustable and optionally nip-adjustable pair of rolls.

In the case of the knife coating process, distinctions are made between gravure and screen printing. With gravure, the knife used takes the form, for example, of a steel strip ground like a knife, with or without supporting bars. It serves to strip the excess additive-containing solution or dispersion from the lands of the printing cylinder. With screen printing, conversely, the knife consists generally of rubber or plastic with an edge ground for sharpness or roundness.

With spray application, the additive-containing solution or dispersion is applied to the nonwoven for furnishing, using at least one nozzle, specifically at least one slotted nozzle.

The nip-padding process (kiss-roll) serves preferably to coat the underside of horizontally running web materials. The coating medium may be applied to the product web in contrarotating or corotating manner. Indirect coating with low application rates may be realized by means of transfer rolls.

In an embodiment, the nonwoven furnished in step f) of the method of an embodiment of the invention with components f1), f2) and/or f3) is subjected to drying and/or thermal treatment. Suitable methods for the drying and/or thermal treatment of nonwovens coated and/or impregnated with additive-containing solutions or dispersions are known in principle. The drying and/or thermal treatment takes place preferably at a temperature in the range from 20 to 250° C., more preferably 40 to 200° C. The drying may additionally take place under reduced pressure.

Step g)

In an embodiment, the gas diffusion layer consists of a two-ply laminate based on a nonwoven and a microporous layer (MPL) on one of the faces of the nonwoven. To produce the gas diffusion layer, the nonwoven obtained in step c), d), e) or f) may be coated correspondingly with a microporous layer.

In contrast to the macroporous nonwoven, the MPL is microporous with pore diameters which are generally well below one micrometer, preferably at most 900 nm, more preferably at most 500 nm, more particularly at most 300 nm. The mean pore diameter of the MPL is preferably in a range from 5 to 200 nm, more preferably from 10 to 100 nm. The mean pore diameter may be determined by mercury porosimetry. The MPL contains conductive carbon particles, preferably carbon black or graphite, in a matrix composed of a polymeric binder. Preferred binders are the aforementioned fluorine-containing polymers, especially polytetrafluoroethylene (PTFE).

The microporous layer preferably has a thickness in the range from 10 to 100 μm (micrometers), more preferably from 20 to 50 μm. This thickness is based on the uncompressed state of the microporous layer B), i.e., before installation of the GDL in a fuel cell.

The gas diffusion layer preferably has a thickness (overall thickness of nonwoven and MPL) in the range from 80 to 1000 μm, more preferably from 100 to 500 μm. This thickness is based on the uncompressed state of the GDL, i.e., before it is installed in a fuel cell.

An embodiment of the invention provides a fuel cell comprising at least one gas diffusion layer as defined above or obtainable by a method as defined above. The gas diffusion layer is suitable in principle for all customary types of fuel cell, especially low-temperature proton exchange membrane fuel cells (PEMFCs). The observations made above regarding the construction of fuel cells are referenced in their entirety.

Embodiments of the invention are illustrated using the following examples, which are not to be understood as imposing any limitation.

EXAMPLES

The determination of the metal contents ($Ca^{2+}$, $Na^{+}$, $Mg^{2+}$ and $K^{+}$) of the base nonwovens composed of oxidized polyacrylonitrile fibers, of the resultant carbonized nonwovens and GDLs took place by an ICP-AES (inductively coupled argon plasma—atomic emission spectrometry) method. The samples (of the digestion) may be pretreated according to the EPA method 3050A for the acid digestion of sediments, sludges and soils. This process comprises the following steps:

1.) Nitric acid digestion at 95° C. for 15 minutes.
2.) Further addition of nitric acid with continuation of digestion for 1 h.
3.) Removal from the hotplate; addition of deionized water and 20% hydrogen peroxide solution.
4.) Heating again on the hotplate for around 15 minutes; removal from the hotplate again when the formation of bubbles has come to a complete standstill.
5.) Addition of concentrated hydrochloric acid and further digestion for 1 h.

For the water jet consolidation, the water used had a conductivity according to table 1 below. The comparative water 1 corresponds to a process water of the kind usual for use in conventional methods for web consolidation with water jets. In the case of water batches 2 and 3, the ionic concentration was reduced by a nanofiltration.

TABLE 1

| Water batch | Conductivity [microsiemens/cm] |
|---|---|
| C1 (comparative) | 290 |
| 2 | 100 |
| 3 | 22 |

Production Example

To produce a base nonwoven, a dry-laid fibrous web composed of 100% oxidized polyacrylonitrile fibers was placed down on a carding system. The fibrous web was supplied to a consolidation unit wherein the fibers are swirled and interlooped with one another by means of high-energy water jets on both sides at pressures of in each case around 100 bar in the first stage and in each case around 200 bar in a second stage. The water grades according to table 1 were used. The nonwoven was dried and rolled up, with the basis weight after water jet consolidation and drying being 150 $g/m^2$. The nonwoven was then subjected to a thickness calibration, whereby the thickness of the water jet-consolidated nonwoven was reduced to 0.25 mm. The nonwoven was then supplied to a carbonizing unit in which carbonization took place under a nitrogen atmosphere at about 1000 to 1400° C.

The nonwoven was furnished using an impregnating composition which in terms of solids contained 70% carbon black and 30% PTFE. Furnishing was accomplished by pad-mangle impregnation with an aqueous dispersion at 15% furnishing weight, based on the mass of the GDL substrate (corresponding to 15 $g/m^2$). This was followed by drying at 180° C. and sintering at 400° C. Applied to the resultant substrate then, additionally, was an MPL paste which contained 2.0 wt % of PTFE and 7.8 wt % of carbon in distilled water. The nonwoven was subsequently dried at 160° C. and sintered at 400° C. The resulting MPL loading was 24 $g/m^2$.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a gas diffusion layer for a fuel cell, comprising:

a) providing a fiber composition which comprises carbon fibers and/or precursors of carbon fibers, b) subjecting the fiber composition provided in step a) to a method for producing a fibrous web, c) consolidating the fibrous web by exposure to aqueous fluid jets to form a nonwoven, water used by the aqueous fluid jets having a conductivity of at most 250 microsiemens/cm at 25° C., e) if the fiber composition used in step a) comprises precursors of carbon fibers, subjecting the nonwoven to pyrolysis at a temperature of at least 1000° C.

2. The method according to claim 1, wherein additionally the nonwoven obtained in step c) or e) is furnished (step f)) with at least one additive selected from hydrophobizing agents f1), conductivity-improving additives f2), further additives f3), and mixtures thereof.

3. The method according to claim 2, wherein additionally the nonwoven obtained in step c), e) or f) is coated (step g)) with a microporous layer.

4. The method according to claim 2, wherein the hydrophobizing agent f1) comprises at least one fluorine-containing polymer.

5. The method according to claim 2, wherein the conductivity-improving additive f2) is selected from metal particles, carbon black, graphite, graphene, carbon nanotubes, carbon nanofibers, and mixtures thereof.

6. The method according to claim 2, wherein the further additive f3) is selected from surface-active substances and polymeric binders other than components f1) and f2), and from mixtures thereof.

7. The method according to claim 2, wherein the nonwoven, during or after the coating and/or impregnation with the hydrophobizing agent in step f1), is subjected to a thermal treatment.

8. The method according to claim 1, wherein the fiber composition provided in step a) comprises precursors of carbon fibers which are selected from nonoxidized polyacrylonitrile fibers, oxidized polyacrylonitrile fibers, and mixtures thereof.

9. The method according to claim 1, wherein the fiber composition provided in step a) additionally comprises further fibers, selected from fibers of phenolic resins, polyesters, polyolefins, cellulose, aramids, polyetherketones, polyetherester-ketones, polyethersulfones, polyvinyl alcohol, lignin, pitch, and mixtures thereof.

10. The method according to claim 1, wherein the fiber composition provided in step a) includes polyacrylonitrile fibers.

11. The method according to claim 1, wherein the fiber composition provided in step a) is subjected in step b) to a dry-laying method for producing a fibrous web.

12. The method according to claim 1, wherein the water used in step c) for consolidating the fibrous web has a conductivity of at most 200 microsiemens/cm at 25° C.

13. The method according to claim 1, wherein the water used in step c) for consolidating the fibrous web is at least partly recycled.

14. The method according to claim 13, wherein:

a fibrous web is consolidated by exposure to aqueous fluid jets to form a nonwoven, a wastewater stream is extracted from treatment of the fibrous web, a setpoint value is specified for a conductivity of the wastewater stream, an actual value of the conductivity of the wastewater stream is determined, and on attainment of a limiting value for a deviation of the actual value from the setpoint value, the wastewater stream is subjected at least partly to processing and/or to exchange with water of lower ionic concentration, and the wastewater stream is returned at least partly to the treatment of the fibrous web.

15. A gas diffusion layer obtained by the method according to claim 1.

16. A fuel cell comprising at least one gas diffusion layer obtained by the method according to claim 1.

17. The method according to claim 1, further comprising:

d) subjecting the nonwoven obtained in step c) to a thermal and/or mechanical treatment for drying and/or further consolidation.

18. The method according to claim 17, wherein the nonwoven obtained in step c) is subjected in step d) to a further consolidation by calendering.

* * * * *